(12) United States Patent
Griffin et al.

(10) Patent No.: US 11,222,041 B2
(45) Date of Patent: Jan. 11, 2022

(54) BLOCKCHAIN-BASED CENTRAL REPOSITORY AND ANALYTICAL PLATFORM FOR COMMUNICATIONS IN THE INTERNET OF THINGS

(71) Applicant: INTERNATIONAL BUSINESS MACHINES CORPORATION, Armonk, NY (US)

(72) Inventors: Adam Lee Griffin, Dubuque, IA (US); Shikhar Kwatra, Durham, NC (US); Darren Lawless, Aurora, CO (US); Thomas Bouve, Koolkerke (BE); Joseph B. Ries, Bellevue, IA (US); Jennifer L. Szkatulski, Rochester, MI (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 16/675,487

(22) Filed: Nov. 6, 2019

(65) Prior Publication Data
US 2021/0133209 A1    May 6, 2021

(51) Int. Cl.
*G06F 7/00* (2006.01)
*G06F 16/27* (2019.01)
(Continued)

(52) U.S. Cl.
CPC .......... *G06F 16/27* (2019.01); *G06F 16/2365* (2019.01); *G06N 5/04* (2013.01);
(Continued)

(58) Field of Classification Search
CPC ....... G06F 16/27; G06F 16/2365; G06N 5/04; G06N 20/10; G06N 3/0445; H04L 67/12
(Continued)

(56) References Cited

U.S. PATENT DOCUMENTS

2015/0332283 A1   11/2015  Witchey
2017/0054611 A1*  2/2017  Tiell ................... H04L 43/0876
(Continued)

FOREIGN PATENT DOCUMENTS

WO      2019070763 A1    4/2019

OTHER PUBLICATIONS

Mell et al., "The NIST Definition of Cloud Computing", Recommendations of the National Institute of Standards and Technology, NIST Special Publication 800-145, Sep. 2011, 7 pages.
(Continued)

*Primary Examiner* — Isaac M Woo
(74) *Attorney, Agent, or Firm* — Robert R. Aragona (57) ABSTRACT

A method, computer system, and a computer program product for communicating and interpreting a plurality of Internet of Things (IoT) sensor data from one or more IoT devices is provided. The present invention may include collecting the plurality of IoT sensor data from the one or more IoT devices associated with a user to a central collection repository. The present invention may then include analyzing the collected plurality of IoT sensor data by utilizing an artificial intelligence (AI) enabled analytics platform. The present invention may also include creating one or more transactions associated with the analyzed plurality of IoT sensor data. The present invention may further include adding the one or more created transactions to a blockchain structure.

18 Claims, 5 Drawing Sheets

(51) Int. Cl.
  *G06F 16/23* (2019.01)
  *H04L 29/08* (2006.01)
  *G06N 5/04* (2006.01)
  *G06N 3/04* (2006.01)
  *G06N 20/10* (2019.01)

(52) U.S. Cl.
  CPC ............ *H04L 67/12* (2013.01); *G06N 3/0445* (2013.01); *G06N 20/10* (2019.01)

(58) Field of Classification Search
  USPC .................................................. 707/600–899
  See application file for complete search history.

(56) References Cited

U.S. PATENT DOCUMENTS

| | | |
|---|---|---|
| 2017/0163733 A1 | 6/2017 | Grefen et al. |
| 2018/0189449 A1 | 7/2018 | Karumba et al. |
| 2018/0337820 A1 | 11/2018 | Chen et al. |
| 2019/0012609 A1 | 1/2019 | Fishler et al. |
| 2019/0013948 A1 | 1/2019 | Mercur et al. |
| 2019/0027234 A1 | 1/2019 | Raduchel |
| 2019/0050368 A1 | 2/2019 | Chen et al. |

OTHER PUBLICATIONS

Azaria et al., "MedRec: Using Blockchain for Medical Data Access and Permission Management", 2016 2nd International Conference on Open and Big Data, 2016 IEEE, pp. 25-30.

Zhao et al., "Feasibility study on security deduplication of medical cloud privacy data", EURASIP Journal on Wireless Communications and Networking, (2018), 2018:185, pp. 1-15.

\* cited by examiner

BLOCKCHAIN-BASED CENTRAL REPOSITORY AND ANALYTICAL PLATFORM FOR COMMUNICATIONS IN THE INTERNET OF THINGS

BACKGROUND

The present invention relates generally to the field of computing, and more particularly to communication between Internet of Things (IoT) enabled devices and management of the data derived from the IoT enabled devices.

As human beings integrate Internet of Things (IoT) devices into their environment as various devices, namely wearable devices, communication devices and environmental interactive technologies, communication between both input and output may become highly valuable. In addition, a system should monitor the entities with access, and control the various devices as well as the inherent information provided by each device. A unified collection of control over such inherent information (or data) may offer builders, engineers, and users new and expansive opportunities for cross-realm development of solutions. Additionally, such data spanning disparate types of systems may represent a potentially novel and powerful repository for data insights, which may have otherwise been undiscovered.

SUMMARY

Embodiments of the present invention disclose a method, computer system, and a computer program product for communicating and interpreting a plurality of Internet of Things (IoT) sensor data from one or more IoT devices. Embodiments of the present invention may include collecting the plurality of IoT sensor data from the one or more IoT devices associated with a user to a central collection repository. The present invention may then include analyzing the collected plurality of IoT sensor data by utilizing an artificial intelligence (AI) enabled Analytics platform, wherein the analyzed plurality of IoT sensor data is dynamically tagged based on one or more personal heuristics associated with the user. The present invention may also include creating one or more transactions associated with the analyzed plurality of IoT sensor data, wherein the created one or more transactions are transmitted to one or more selected entities based on one or more user preferences. The present invention may further include adding the one or more created transactions to a blockchain structure.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for interpreting a piece of IoT sensor data from the one or more IoT devices. As such, embodiments of the present invention have the capacity to improve the technical fields of communication between Internet of Things (IoT) enabled devices and management of the data derived from the IoT enabled devices by seamless communicating between one or more IoT devices and interpreting the piece of IoT sensor data from the one or more IoT devices. More specifically, the IoT device communication program may collect, analyze and summarize IoT sensor data, and then create and track a transaction with a selected entity. The IoT device communication program may further write each transaction onto a blockchain structure.

As previously described, as human beings integrate Internet of Things (IoT) devices into their environment as various devices, namely wearable devices, communication devices and environmental interactive technologies, communication between both input and output may become highly valuable. In addition, a system should monitor the entities with access, and control the various devices as well as the inherent information provided by each device. A unified collection of control over such inherent information (or data) may offer builders, engineers, and users new and expansive opportunities for cross-realm development of solutions. Additionally, such data spanning disparate types of systems may represent a potentially novel and powerful repository for data insights, which may have otherwise been undiscovered.

IoT devices may utilize proprietary communication channels and may not be well integrated with other technologies. As information flows from one IoT device to a repository, access to that information, as well as control of the IoT devices, may remain segmented and insecure. There may currently be no means to integrate information from disparate devices into one system and view. In turn, there may exist no secure method of information and action transfer between these IoT devices. As such, there may be no confident method tracking and granting access to and from IoT-based devices and the data (or information) included within the IoT devices.

Therefore, it may be advantageous to, among other things, control and safeguard the communication between IoT devices based on user preferences and IoT input/output data and interpretive analysis.

According to at least one embodiment, the IoT device communication program may enable seamless communication and interpretation of data despite varying communication protocols and communication mechanisms by, utilizing a support vector machine (SVM)+bidirectional long-short memory model (Bi-LSTM) model, infused with an analytics module to analyze sensor data capitalizing on user data and insight as input and may aid in decision making that affect explicit outcome. The IoT device communication program may also utilize a random forest or logistic regression model infused with the LSTM model to capitalize on input data and to make accurate predictions.

According to at least one embodiment, the IoT device communication program may establish a chain of transaction between IoT enabled devices by incorporating analytic data and outcome recommendations.

According to at least one embodiment, the IoT device communication program may further incorporate data from both passive and dynamic/active sources, namely user sensor data, analytical decision making, and recipient feedback, thereby creating a system of communication enhanced by enrichment of input/output pairing.

Figure 1:
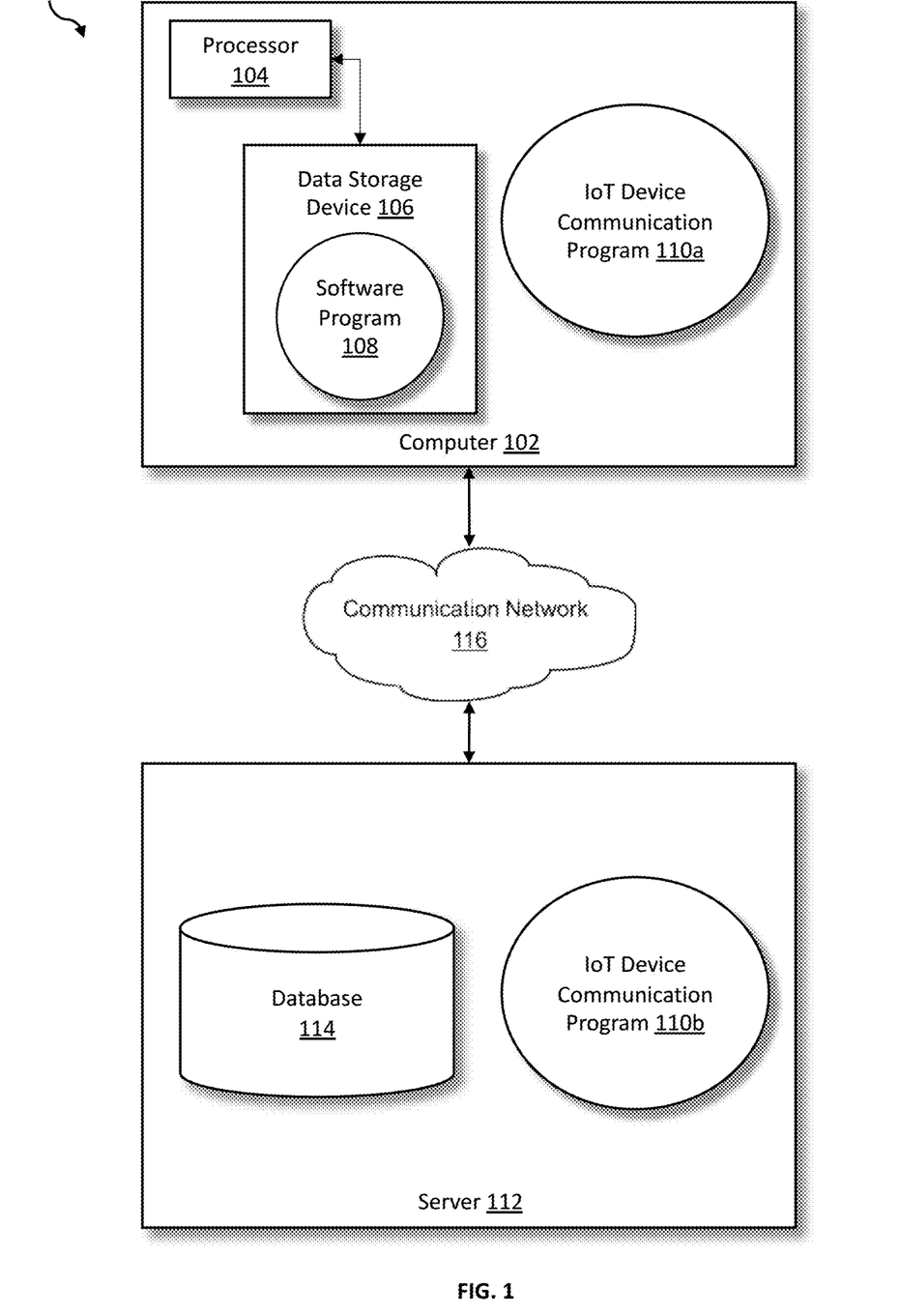
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an IoT device communication program 110a. The networked computer environment 100 may also include a server 112 that is enabled to run an IoT device communication program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the IoT device communication program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the IoT device communication program 110a, 110b (respectively) to communicate between one or more IoT devices and interpret a piece of IoT sensor data from the one or more IoT devices. The IoT device communication method is explained in more detail below with respect to FIG. 2.

Figure 2:
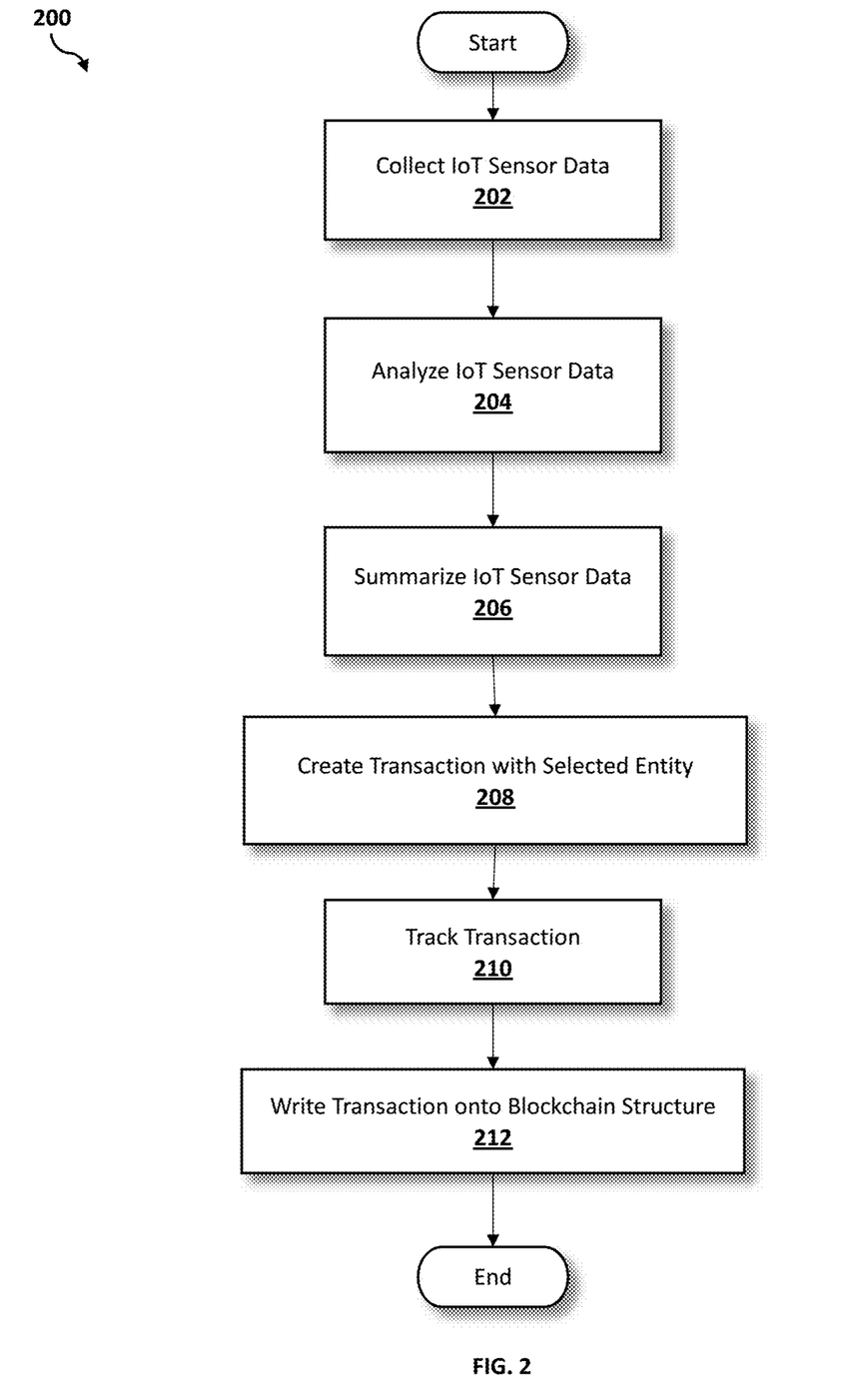
FIG. 2 is an operational flowchart illustrating a process for communicating with one or more Internet of Things (IoT) devices according to at least one embodiment.

Referring now to FIG. 2, an operational flowchart illustrating the exemplary Internet of Things (IoT) device communication process 200 used by the IoT device communication program 110a, 110b according to at least one embodiment is depicted.

At 202, IoT sensor data is collected. Utilizing a software program 108 on the user's device (e.g., user's computer 102), Internet of Things (IoT) sensor data from various IoT devices, within an IoT network, may be transmitted as input into the IoT device communication program 110a, 110b via the communication network 116. The IoT network may include consumer or personal IoT networks (e.g., home, personal devices), enterprise IoT networks (e.g., offices) and industrial IoT networks (e.g., manufacturing facilities). The IoT devices may include wearable devices (e.g., watches, augmented reality/virtual reality eyeglasses), connected communication devices (e.g., smart sensors connected to industrial machines, smart home technology, smart televisions, smart speakers, toys, smart security systems, virtual assistant devices, smart lights, smart appliances), and/or environmental interactive technologies (e.g. smart thermostats, smart motion sensors). In at least one embodiment, the IoT device communication program 110a, 110b may be connected to one or more separate IoT devices, with multiple sensors connected to each IoT device.

In at least one embodiment, a user may have to manually select the IoT devices to include in the IoT network for the IoT device communication program 110a, 110b. In one embodiment, the IoT device communication program 110a, 110b may automatically update the IoT network, and integrate additional IoT devices based on several factors, namely location of the IoT devices, the function of the IoT devices, and past history of usage by the user (e.g., when did the user use the IoT devices, whether the IoT devices used in connection with the IoT devices were a part of one or more IoT networks). In some embodiments, the IoT devices may be connected to, or communicating with, additional network sensor recipients in which network sensor recipients are basically sensors capable of ingesting information from other sensors and communicate over the network protocol to understand the network packets being communicated and shared with each other in an IoT platform.

For example, User Z has a medical condition that causes states of low blood sugar. As such, User Z wears a watch that utilizes IoT sensors to continuously monitor User Z's vitals, and a glucose monitoring device that utilizes sensors under User Z's upper arm to continuously monitor the blood sugar levels of User Z. IoT sensor data from the watch and the glucose monitoring device are collected by the central collection repository used by the IoT device communication program 110a, 110b. The IoT sensor data from the User Z's watch and glucose monitoring device is communicated to additional network sensor recipients.

Next, at 204, IoT sensor data is analyzed. The collected IoT sensor data, within the IoT network, may communicate with a central collection repository (e.g., database 114). The central communication repository may record the collected IoT sensor data (e.g., data and any metadata). In one embodiment, the central collection repository may combine the collected IoT sensor data from one or more separate IoT devices based on the time in which the IoT sensor data was retrieved, the type of IoT sensor data (e.g., medical data, data associated with the user movement data associated with a conversation with the user), the form of the IoT sensor data (e.g., textual data, auditory data), or who the IoT sensor data is associated with (e.g., when there are multiple users, IoT sensor data for the each user may be combined and separated from each other). In at least one embodiment, the collected IoT sensor data may be stored in the central collection repository.

The IoT device communication program 110*a*, 110*b* may then utilize an AI enabled analytics platform and/or AI enabled analytics engine (e.g., IBM Watson®) to analyze the collected IoT sensor data (i.e., collective data) for insight, anomaly detection, prediction, metadata exploration, and any other significant information.

Utilizing enabling communication technologies (e.g., Wi-Fi, near-field communication (NFC), radio frequency identification (RFID), Bluetooth® (Bluetooth and all Bluetooth-based trademarks and logos are trademarks or registered trademarks of Bluetooth SIG, Inc. and/or its affiliates)), the analyzed IoT sensor data may be sent to multiple receivers, where the analyzed IoT sensor data may be appended to multiple applications to provide context and meaning to the analyzed IoT sensor data, namely a cloud-based application that enables developers and domain experts to collaborate on the creation of custom annotator components that may be used to identify the mentions and relations in unstructured text (e.g., IBM Watson® Knowledge Studio), a service that assists with uncovering connections in data by combining automated ingestion with advanced AI functions (e.g., IBM Watson® Discovery), a data catalog that is tightly integrated with an enterprise data governance platform thereby assisting business users with quickly discovering, curating, and using the collected data (e.g., IBM Watson® Knowledge Catalog), and a data platform that builds analytical models and neural networks trained with the collected data (e.g., IBM Watson® machine learning (ML) model).

In at least one embodiment, as part of the ML model framework, the IoT device communication program 110*a*, 110*b* may deploy a combination of support vector machine (SVM) classifier with bidirectional long-short term memory model (Bi-LSTM) to keep track of personal heuristics by ingesting the data-points encountered by the analyzed IoT sensor data. In one embodiment, the LSTM model may use a gating mechanism to handle long-term dependencies, which may include a sigmoid function layer that outputs between zero (e.g., a value of zero may represent that none of the information passed through) and one (e.g., a value of one may represent that the information passed through). In one other embodiment, IoT device communication program 110*a*, 110*b* may also utilize a random forest or logistic regression model infused with the LSTM model to capitalize on input data and to make accurate predictions.

In some embodiments, weights associated with the inputs may be continuously updated to achieve the best possible output reading reducing the loss value. Additionally, a learning rate may determine how fast the parameters may be updated.

In at one other embodiment, based on personal heuristics, personal norms may be identified and significant variances from such personal norms may be documented and may be added to an analysis algorithm, which may include as follows:

$$e = \text{Sensor}(n) \text{ Delta} + \text{Sensor}(m) \text{ Delta}$$

where e signifies an event for analysis

In the present embodiment, if the Sensor (n) Delta may be in a significant range (e.g., >=1), e may be triggered and the blockchain ledger may be updated.

In at least one embodiment, the IoT sensor data (i.e., sensory information) may be stored in the Bi-LSTM model for pattern history sequencing and referencing to identify anomalies and variations in data along with other metadata. In one embodiment, the SVM classifier may categorize (i.e., classify) the sensory data values derived from the IoT sensor data into separate clusters to find if the sensor delta may exceed beyond a specific pre-configured or learnt threshold.

In another embodiment, the IoT device communication program 110*a*, 110*b* may utilize key words, and natural language processing (NLP) techniques (e.g., structure extraction, language identification, tokenization, decompounding, lemmatization/stemming, acronym normalization and tagging, entity extraction, phrase extraction) to analyze IoT sensor data. Then, individual words, phrases, and/or sentences, as well as the relationships between the individual words, phrases and/or sentences, may be extracted from the processed textual data by utilizing various extraction approaches (e.g., top down, bottoms up, statistical). As a result, the IoT device communication program 110*a*, 110*b* may interpret the context and meaning for the words, phrases and/or sentences collected by the IoT sensor data.

In one embodiment, the central collection repository may combine the collected and analyzed IoT sensor data that includes similarities (e.g., similar key words, similar context and meaning).

In at least one embodiment, the IoT device communication program 110*a*, 110*b* may compare the audio recording or textual data with the historical normative data by utilizing IBM Watson® Artificial Intelligence (AI) services (IBM Watson and all IBM Watson-based trademarks and logos are trademarks or registered trademarks of International Business Machines Corporation and/or its affiliates) to provide context and meaning to the collective data.

Continuing the previous example, the central collection repository receives User Z's blood sugar levels and vitals, and feeds, as input, the IoT sensor data into a SVM+Bi-LSTM model in which the past blood sugar levels and vitals of User Z are compared to determine whether the blood sugar levels fall below the established threshold. While driving to work, the Bi-LSTM model receives a blood sugar level of 69 milligrams per deciliter (mg/dL), and after analyzing the blood sugar level, the SVM classifier classifies the blood sugar level of 69 mg/dL as low and possible diabetic hypoglycemia.

Then, at 206, the IoT sensor data is summarized. The analyzed IoT sensor data may then be summarized into a human consumable text at varying levels based on the audience (e.g., medical professional, patient, parent, spouse, or other selected entity). The IoT device communication program 110*a*, 110*b* may utilize a speech-to-text engine (e.g., the IBM Watson® Speech to Text) to convert information into textual data, or a text-to-speech engine (e.g., the IBM Watson® Text to Speech) to convert information to speech (or audio recordings) or auditory data.

In at least one embodiment, the summarized IoT sensor data may be tagged (i.e., metadata), which may include a key word or term associated with the IoT sensor data to describe the information included in the IoT sensor data. In at least one embodiment, the tag may enable a searching module to browse or search the central collection repository to find the IoT sensor data for future purposes. The tagged IoT sensor data may be stored in the central collection repository, based on blockchain methodologies, for access to be monitored and for the transactions associated with the IoT sensor data to be recorded by the central collection repository.

Continuing the previous example, the IoT device communication program 110a, 110b summarizes the IoT sensor data output as low and possible diabetic hypoglycemia, and therefore, tags the 69 mg/dL as low blood sugar level for User Z.

Then, at 208, a transaction with a selected entity is created. The central collection repository may further compare the IoT sensor data output with user preferences, which were previously determined by the user. The user preferences may be utilized for the central collection repository to determine how to treat the IoT sensor data output, including who to send the IoT sensor data output to (e.g., user's primary care physician, parental entity, insurance company, spouse, personal caretaker), type of IoT sensor data output that may be sent to an entity or party (e.g., based on key words and context how much the IoT sensor data output to be sent to an entity), how to send the IoT sensor data output to an entity or party (e.g., send the IoT sensor data output via email, short message service (SMS), multimedia messaging service (MMS) and auditory message), and the urgency of the IoT sensor data output (e.g., whether the IoT sensor data output indicates an urgency matter).

Based on the user preferences, the IoT device communication program 110a, 110b may create a transaction between the central collection repository to one or more selected entities. In at least one embodiment, the IoT sensor data output may be sent to multiple entities based on the user preferences, and therefore, the IoT device communication program 110a, 110b may have to create multiple transactions for the piece of IoT sensor data output.

In at least one embodiment, the IoT device communication program 110a, 110b may send the raw IoT sensor data to one or more selected receivers based on user preferences.

In one embodiment, the user preferences may include the IoT device communication program 110a, 110b creating a second transaction between the selected entity and a desired action and/or secondary entity. For example, the IoT sensor data output from User A's mobile device indicate that User A's heartrate is dangerously high. As such, the preferences of User A include that if User A's heart rate exceeds 98 beats per minute, then User A's cardiologist should be contacted. Therefore, the first transaction created by the IoT device communication program 110a, 110b is to immediately contact, via SMS, User A's cardiologist. The user preferences also include three other desired actions, namely contact User A's spouse, alert User A's cardiologist if the User A is at rest or exercising, and alert User A. As such, the IoT device communication program 110a, 110b creates a second transaction to contact User A's spouse, via SMS, to notify User A's spouse of the dangerously high heartrate, and based on the IoT sensor data output from the gyroscope of User A's mobile device that indicates that User A is exercising, a third transaction is created to contact User A's cardiologist with this information. Then, the fourth transaction, via SMS to User A, is created to warn User A to stop exercising due to the dangerously high heartrate, and further notifying User A that User A's cardiologist and spouse were notified as well.

Continuing the previous example, User Z's user preferences include creating a transaction in which if User Z is driving based on User Z's mobile device being connected to User Z's vehicle and User Z has been identified as the driver of the vehicle, User Z's vehicle is able to receive IoT sensor data output. Once the vehicle is alerted that the transaction has been created to indicate a variance in the blood sugar levels in the threshold of actionable outcome. When the threshold is reached, the vehicle alerts User Z that User Z's blood sugar levels are too low for User Z to safely operate the vehicle, and therefore, the vehicle will be placed in an inoperable condition in five minutes and User Z is prohibited from operating the vehicle. Additionally, based on User's Z user preferences, the IoT device communication program 110a, 110b creates a second transaction to User Z's best friend in which Best Friend Z is provided the location of User Z and the details of the IoT sensor output.

Then, at 210, the transaction is tracked. Each transaction may track information associated with the IoT sensor data output (e.g., who accessed the IoT sensor data output, what piece of the IoT sensor data output was accessed or modified, how the IoT sensor data output was accessed or modified, when the transaction occurred). The tracked information associated with the IoT sensor data output may be stored in the central collection repository.

Continuing the previous example, the vitals and blood sugar levels, included in the IoT sensor data output, as well as the two transactions created as tracked. The IoT device communication program 110a, 110b determines that User Z parked the vehicle at the intersection of Main Street and Avenue J within two minutes of receiving the alert, and Best Friend Z read the message within three minutes of receiving the message and promptly sent a text message to User Z to inform User Z that Best Friend Z will pick User Z up in 15 minutes.

Then, at 212, the transaction is written onto a blockchain structure. Blockchain technology may include a shared log of events that are kept in blocks of data that may be passed to the next transaction in a linear order. A block may contain the data of one or more records or transactions. A block may hold or store the data before the block has been completed, prior to consensus and prior to being transferred to the next block in a blockchain, for example, using a transaction pool, a memory pool or a candidate block. A block may also be a block of one or more records or transactions attached to a blockchain, for example, a transaction that has been permanently appended and recorded to the files in a blockchain.

With blockchain technology, for example, when a transaction is written into a ledger, there may be a mechanism to make sure all the records are synchronized and if the network system detects an error, the error may be immediately corrected. Blockchain systems are immutable since, for example, a hash value on each block may be created and any change or amendment in data will show a different hash value. Each block may contain the hash of the previous block and the current transactions before the next hash may be created. Once consensus is reached, the data may be verified. Each block may have a hash value of the previous block in the chain and there may be no way to modify the data in the previous block. If the data is modified, the modified data may be detected by a re-calculated hash value. A different hash value may show that the network system has been compromised.

The transaction, which includes any details associated with the transaction, tracked information, and the IoT sensor data output associated with the transaction, may be added to a blockchain structure (i.e., blockchain ledger) by the IoT device communication program 110a, 110b. In at least one embodiment, the decisions and actions associated with the transaction may be added to the blockchain structure.

Continuing the previous example, the two transactions are stored on the blockchain structure, along with Best Friend Z's actions and User Z's response by parking the vehicle shortly after receiving the alert.

The IoT device communication program 110a, 110b may improve the functionality of the computer, the technology and/or the field of technology by enabling seamless communication and interpretation of data despite varying communication protocols and communication mechanisms by utilizing a support vector machine (SVM)+bidirectional long-short memory model (Bi-LSTM) model infused with an analytics module to analyze sensor data capitalizing on user data and insight as input and may aid in decision making that affect explicit outcome. The IoT device communication program 110a, 110b may establish a chain of transactions between IoT enables devices by incorporating analytic data and outcome recommendations.

Unlike existing systems, the IoT device communication program 110a, 110b may further incorporate data from both passive and dynamic/active sources, namely user sensor data, analytical decision making, and recipient feedback, thereby creating a system of communication enhanced by enrichment of input/output pairing. The IoT device communication program 110a, 110b may utilize dynamic tagging of data based the personal heuristics of the user to enable data sharing on a blockchain network to be distributed with selective accessibility over the blockchain network (i.e., blockchain structure). As such, the blockchain may include nodes for metadata associated with the user that includes contextual connections (e.g., parental entity, insurance company, or caretaker) to be added to the node. The IoT device communication program 110a, 110b may then establish a hierarchical framework to dynamically share user's information which the parties of interest depending on the time of the occurrence of the transaction.

In the present embodiment, the IoT device communication program 110a, 110b may be utilized with hereditary disease and risk tracking. For example, individuals suffering from a hereditary disease may opt to provide their children's primary care physician access to a specific subset of collected or monitored IoT health data to help build an appropriate risk profile. Any changes in the health parameters for the parents, tracked and enhanced through AI platform, such as IBM Watson®, and to which the children's primary care physician is provided access may be used to immediately adjust any ongoing analysis and even be combined with medical IoT sensor data from the children to further improve and preemptively adjust medication.

The present embodiment may be utilized in judiciary and governmental control of action where output is monitored based on sensory and analytical input. For example, upon governmental judgment, an individual, imposed by court order, to provide biometric access to data during a period of time dictated by the judiciary system. During this time, sensory input, such as blood alcohol level and/or salivary alcohol content, may be monitored for alterations beyond an established threshold.

In the present embodiment, the IoT device communication program 110a, 110b may be utilized in personal comfort mechanisms that are deployed based on sensory input and user-selected outcomes. For example, in the condition that an individual's body temperature is measured by sensory IoT devices as below threshold, networked IoT devices (e.g., heat and air conditioning) are modified to return the input threshold to an optimal state.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
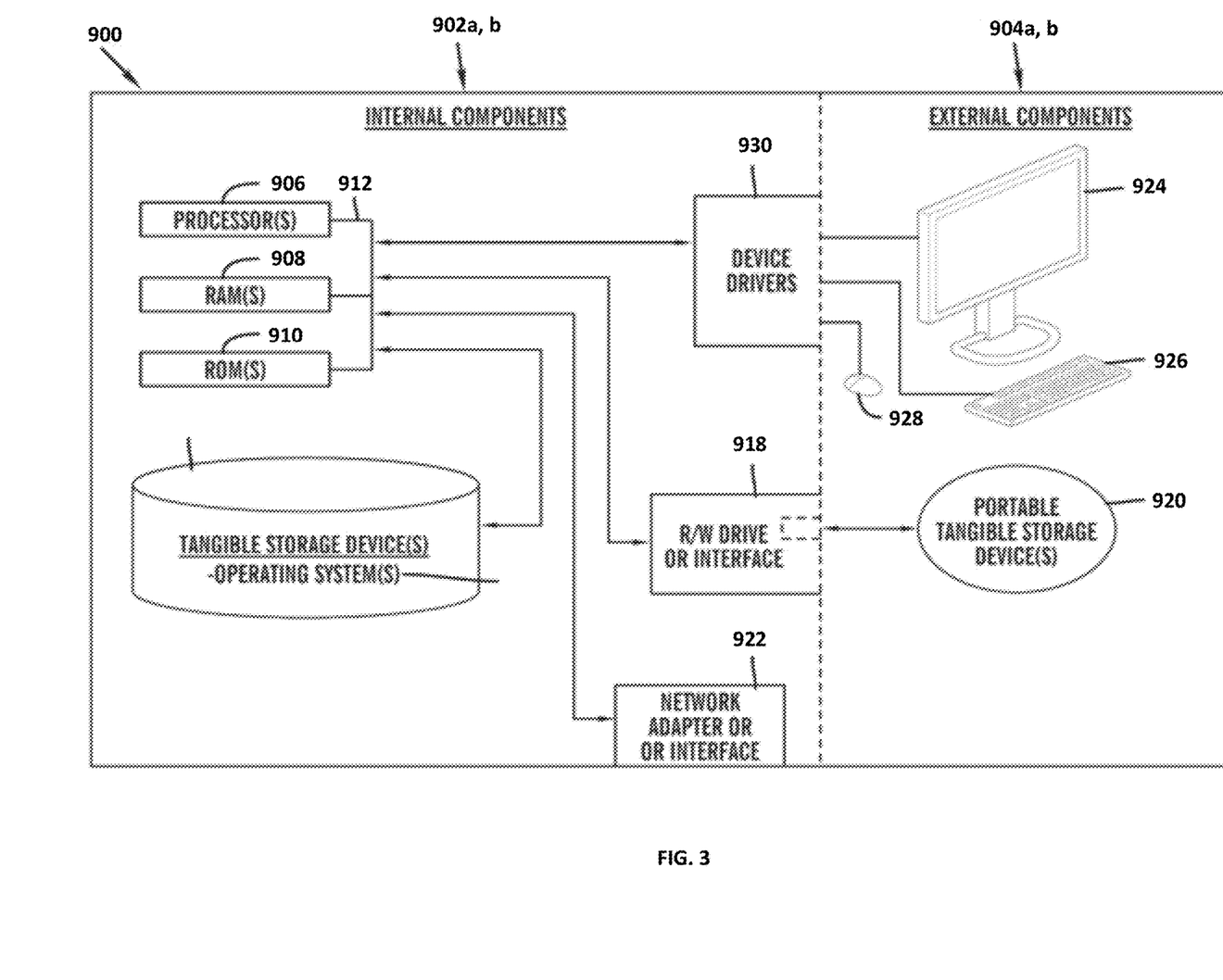
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the IoT device communication program 110a in client computer 102, and the IoT device communication program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the IoT device communication program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the IoT device communication program 110*a* in client computer 102 and the IoT device communication program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the IoT device communication program 110*a* in client computer 102 and the IoT device communication program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including networks, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
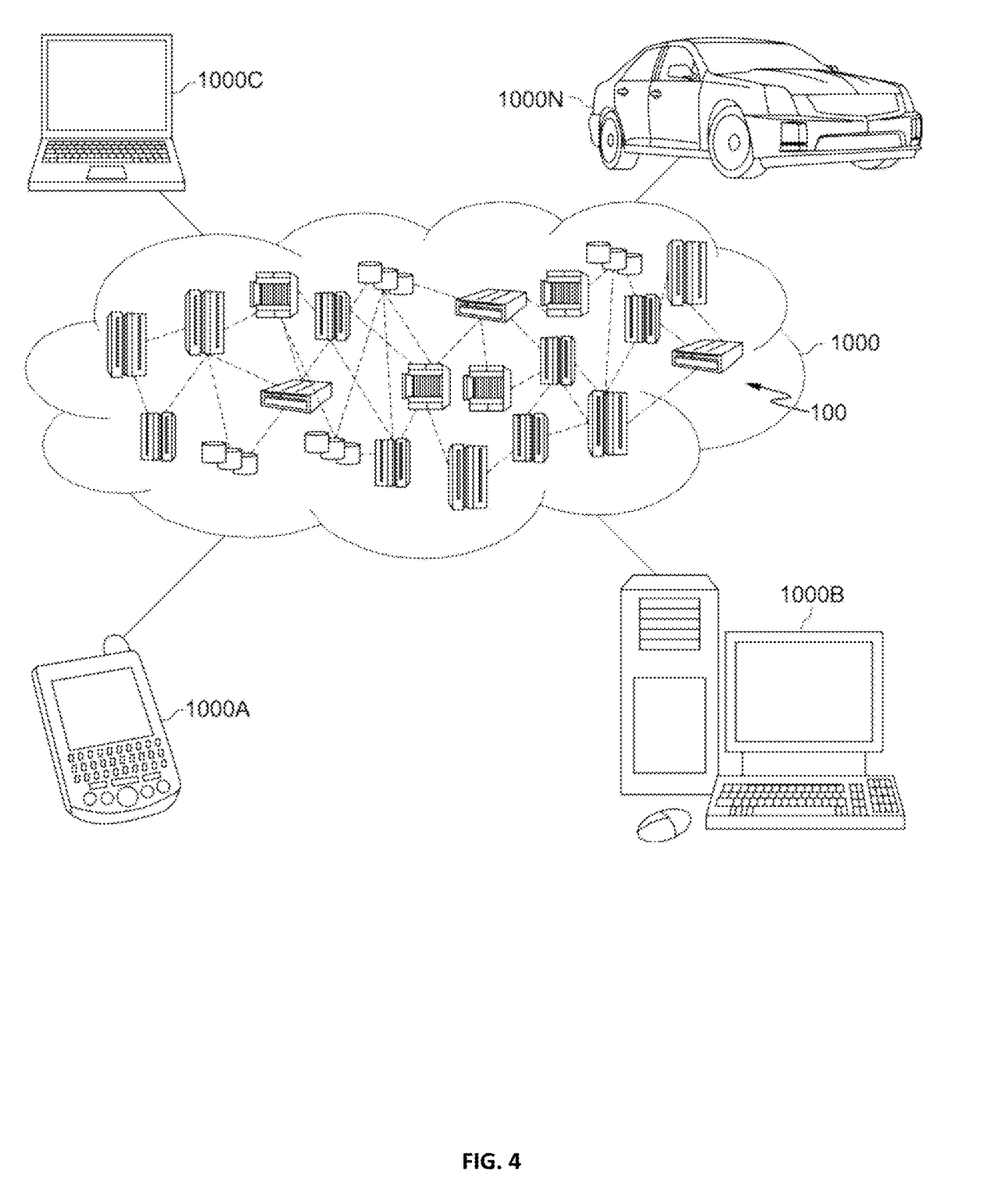
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
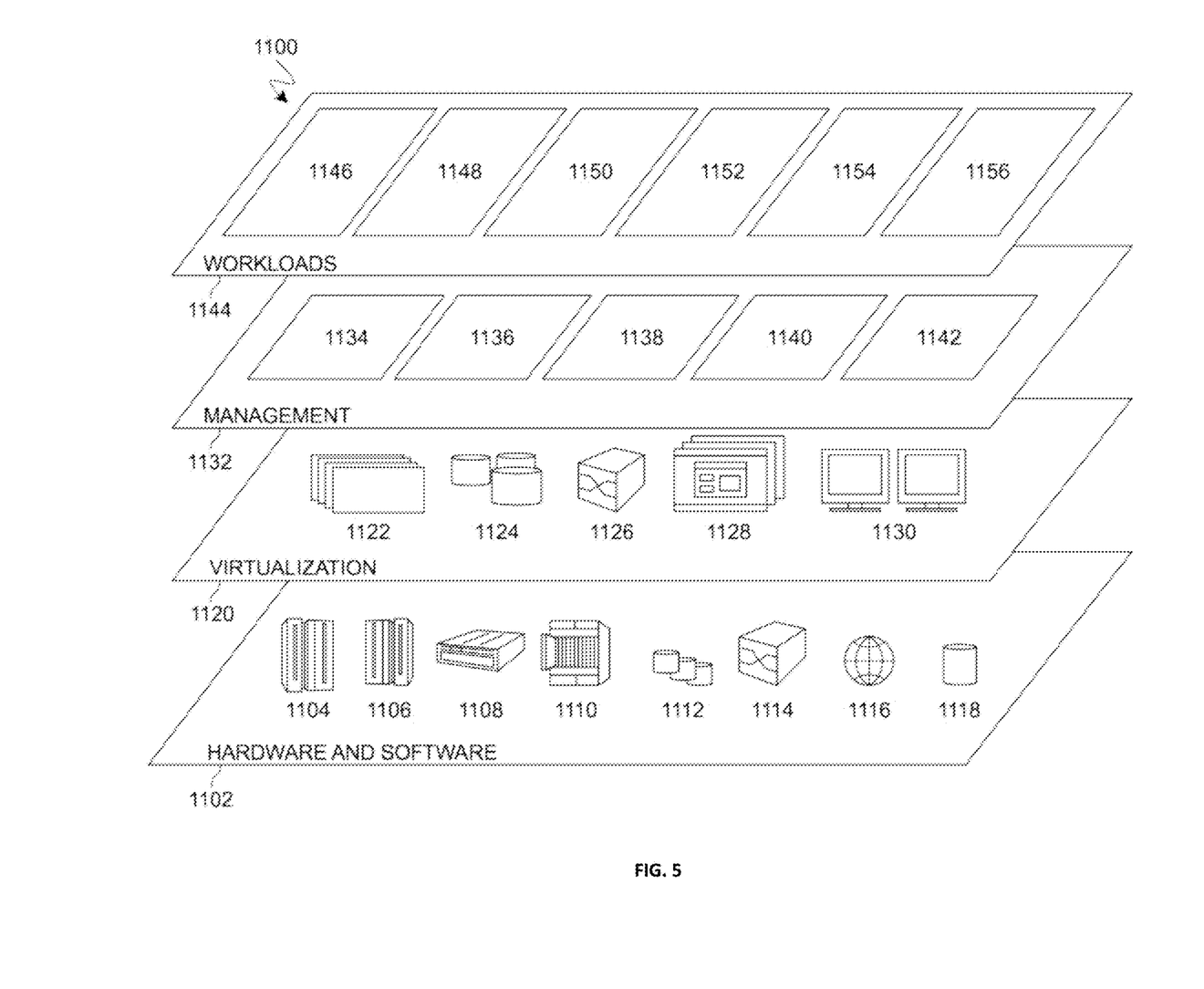
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and IoT device communication 1156. An IoT device communication program 110a, 110b provides a way to communicate between one or more IoT devices and interpret a piece of IoT sensor data from the one or more IoT devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    collecting a plurality of Internet of Things (IoT) sensor data from one or more IoT devices associated with a user to a central collection repository;
    analyzing the collected plurality of IoT sensor data by utilizing an artificial intelligence (AI) enabled analytics platform,
        wherein the analyzed plurality of IoT sensor data is dynamically tagged based on one or more personal heuristics associated with the user, wherein analyzing the collected plurality of IoT sensor data by utilizing the AI platform, wherein the analyzed plurality of IoT sensor data is dynamically tagged based on the one or more personal heuristics associated with the user, further comprises:
            transmitting the analyzed plurality of IoT sensor data to a plurality of receivers, wherein the analyzed plurality of IoT sensor data is appended to a plurality of applications to provide context and meaning to the analyzed plurality of IoT sensor data; and
            combining the analyzed plurality of IoT sensor data based on one or more similarities associated with the analyzed plurality of IoT sensor data, wherein the central collection repository combines and stores the analyzed plurality of IoT sensor data;
    creating one or more transactions associated with the analyzed plurality of IoT sensor data,
        wherein the created one or more transactions are transmitted to one or more selected entities based on one or more user preferences; and
    adding the one or more created transactions to a blockchain structure.

2. The method of claim 1, further comprising:
    summarizing the analyzed plurality of IoT sensor data into one or more human consumable texts based on the one or more selected entities associated with the one or more user preferences.

3. The method of claim 1, further comprising:
    tracking the created one or more transactions associated with the plurality of IoT sensor data; and
    storing the tracked one or more transactions in the central collection repository.

4. The method of claim 1, wherein collecting the plurality of IoT sensor data from the one or more IoT devices associated with the user to the central collection repository, further comprises:

associating the collected plurality of IoT sensor data to one or more IoT networks.

5. The method of claim 1, further comprising:
tracking the one or more personal heuristics by utilizing a support vector machine (SVM) classifier with a bi-directional long-short term memory model (Bi-LSTM), wherein one or more data points associated with the plurality of IoT sensor data are ingested; and
utilizing a gating mechanism to resolve one or more long-term dependencies, wherein the gating mechanism uses a sigmoid function layer.

6. The method of claim 1, wherein creating the one or more transactions associated with the analyzed plurality of IoT sensor data, further comprises:
sharing the analyzed plurality of IoT sensor data associated with the created one or more transactions to the one or more selected entities, wherein the one or more selected entities include one or more parties of interest.

7. The method of claim 1, wherein analyzing the collected plurality of IoT sensor data by utilizing the AI enabled analytics platform, wherein the analyzed plurality of IoT sensor data is dynamically tagged based on one or more personal heuristics associated with the user, further comprises:
creating one or more tags for the summarized plurality of IoT sensor data,
wherein one or more created tags include one or more terms associated with the summarized plurality of IoT sensor data that describes the summarized plurality of IoT sensor data.

8. The method of claim 1, wherein adding the one or more created transactions to the blockchain structure, further comprises:
storing the created one or more transactions associated with analyzed plurality of sensor data on one or more blockchain nodes associated with the user, wherein the one or more blockchain nodes includes one or more selected entities associated with the one or more user preferences;
distributing, over the blockchain structure, the created one or more transactions based on the one or more user preferences.

9. A computer system for communicating and interpreting a plurality of Internet of Things (IoT) sensor data from one or more IoT devices, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
collecting the plurality of IoT sensor data from the one or more IoT devices associated with a user to a central collection repository;
analyzing the collected plurality of IoT sensor data by utilizing an artificial intelligence (AI) enabled analytics platform,
wherein the analyzed plurality of IoT sensor data is dynamically tagged based on one or more personal heuristics associated with the user, wherein analyzing the collected plurality of IoT sensor data by utilizing the AI platform, wherein the analyzed plurality of IoT sensor data is dynamically tagged based on the one or more personal heuristics associated with the user, further comprises:

transmitting the analyzed plurality of IoT sensor data to a plurality of receivers, wherein the analyzed plurality of IoT sensor data is appended to a plurality of applications to provide context and meaning to the analyzed plurality of IoT sensor data; and
combining the analyzed plurality of IoT sensor data based on one or more similarities associated with the analyzed plurality of IoT sensor data, wherein the central collection repository combines and stores the analyzed plurality of IoT sensor data;
creating one or more transactions associated with the analyzed plurality of IoT sensor data,
wherein the created one or more transactions are transmitted to one or more selected entities based on one or more user preferences; and
adding the one or more created transactions to a blockchain structure.

10. The computer system of claim 9, further comprising:
summarizing the analyzed plurality of IoT sensor data into one or more human consumable texts based on the one or more selected entities associated with the one or more user preferences.

11. The computer system of claim 9, further comprising:
tracking the created one or more transactions associated with the plurality of IoT sensor data; and
storing the tracked one or more transactions in the central collection repository.

12. The computer system of claim 9, wherein collecting the plurality of IoT sensor data from the one or more IoT devices associated with the user to the central collection repository, further comprises:
associating the collected plurality of IoT sensor data to one or more IoT networks.

13. The computer system of claim 9, further comprising:
tracking the one or more personal heuristics by utilizing a support vector machine (SVM) classifier with a bi-directional long-short term memory model (Bi-LSTM), wherein one or more data points associated with the plurality of IoT sensor data are ingested; and
utilizing a gating mechanism to resolve one or more long-term dependencies, wherein the gating mechanism uses a sigmoid function layer.

14. The computer system of claim 9, wherein creating the one or more transactions associated with the analyzed plurality of IoT sensor data, further comprises:
sharing the analyzed plurality of IoT sensor data associated with the created one or more transactions to the one or more selected entities, wherein the one or more selected entities include one or more parties of interest.

15. The computer system of claim 9, wherein analyzing the collected plurality of IoT sensor data by utilizing the AI platform, wherein the analyzed plurality of IoT sensor data is dynamically tagged based on the one or more personal heuristics associated with the user, further comprises:
creating one or more tags for the summarized plurality of IoT sensor data,
wherein one or more created tags include one or more terms associated with the summarized plurality of IoT sensor data that describes the summarized plurality of IoT sensor data.

16. The computer system of claim 9, wherein adding the one or more created transactions to the blockchain structure, further comprises:
storing the created one or more transactions associated with analyzed plurality of sensor data on one or more blockchain nodes associated with the user, wherein the one or more blockchain nodes includes one or more selected entities associated with the one or more user preferences;

distributing, over the blockchain structure, the created one or more transactions based on the one or more user preferences.

17. A computer program product for communicating and interpreting a plurality of Internet of Things (IoT) sensor data from one or more IoT devices, comprising:

one or more computer-readable tangible storage media and program instructions stored on at least one of the one or more computer-readable tangible storage media, the program instructions executable by a processor to cause the processor to perform a method comprising:

collecting the plurality of IoT sensor data from the one or more IoT devices associated with a user to a central collection repository;

analyzing the collected plurality of IoT sensor data by utilizing an artificial intelligence (AI) enabled analytics platform, wherein the analyzed plurality of IoT sensor data is dynamically tagged based on one or more personal heuristics associated with the user, wherein analyzing the collected plurality of IoT sensor data by utilizing the AI platform, wherein the analyzed plurality of IoT sensor data is dynamically tagged based on the one or more personal heuristics associated with the user, further comprises:

transmitting the analyzed plurality of IoT sensor data to a plurality of receivers, wherein the analyzed plurality of IoT sensor data is appended to a plurality of applications to provide context and meaning to the analyzed plurality of IoT sensor data; and combining the analyzed plurality of IoT sensor data based on one or more similarities associated with the analyzed plurality of IoT sensor data, wherein the central collection repository combines and stores the analyzed plurality of IoT sensor data;

creating one or more transactions associated with the analyzed plurality of IoT sensor data, wherein the created one or more transactions are transmitted to one or more selected entities based on one or more user preferences; and adding the one or more created transactions to a blockchain structure.

18. The computer program product of claim 17, further comprising:

summarizing the analyzed plurality of IoT sensor data into one or more human consumable texts based on the one or more selected entities associated with the one or more user preferences.

* * * * *